(12) United States Patent
Langadi

(10) Patent No.: US 9,910,803 B2
(45) Date of Patent: Mar. 6, 2018

(54) MULTI MASTER ARBITRATION SCHEME IN A SYSTEM ON CHIP

(71) Applicant: Texas Instruments Incorporated, Dallas, TX (US)

(72) Inventor: Saya Goud Langadi, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 615 days.

(21) Appl. No.: 14/306,970

(22) Filed: Jun. 17, 2014

(65) Prior Publication Data

US 2014/0372648 A1    Dec. 18, 2014

Related U.S. Application Data

(60) Provisional application No. 61/835,939, filed on Jun. 17, 2013.

(51) Int. Cl.
G06F 13/12 (2006.01)
G06F 13/37 (2006.01)
G06F 13/16 (2006.01)

(52) U.S. Cl.
CPC .......... *G06F 13/37* (2013.01); *G06F 13/1657* (2013.01)

(58) Field of Classification Search
CPC ..... G06F 13/00; G06F 13/364; G06F 13/4022
USPC ......................................................... 710/260
See application file for complete search history.

(56) References Cited

U.S. PATENT DOCUMENTS

| | | | | |
|---|---|---|---|---|
| 5,884,051 A | * | 3/1999 | Schaffer | G06F 13/364 710/107 |
| 7,225,285 B1 | * | 5/2007 | Fairman | G06F 13/24 710/266 |
| 8,595,402 B1 | * | 11/2013 | Erlich | G06F 13/00 710/107 |
| 2012/0124260 A1 | * | 5/2012 | Kothamasu | G06F 13/4022 710/110 |

* cited by examiner

*Primary Examiner* — Titus Wong
(74) *Attorney, Agent, or Firm* — John R. Pessetto; Charles A. Brill; Frank D. Cimino

(57) ABSTRACT

A multi master system on chip (SoC) includes a plurality of masters comprising a first master and a second master, each configured to generate a request. A next state generator in the multi master SoC is configured to generate a next state of a round robin pointer in response to the request and a current state of the round robin pointer. The round robin pointer is configured to generate an enable signal to enable a priority encoder for the first master in response to the current state of the round robin pointer. Further, the next state of the round robin pointer is generated such that a priority is maintained for the first master until there is a request from the second master.

19 Claims, 4 Drawing Sheets

MULTI MASTER ARBITRATION SCHEME IN A SYSTEM ON CHIP

CROSS REFERENCES TO RELATED APPLICATIONS

This application claims priority from U.S. provisional application 61/835,939 filed on Jun. 17, 2013, which is hereby incorporated by reference in its entirety.

TECHNICAL FIELD

Embodiments of the disclosure relate to arbitration in a multi-master system on chip (SoC).

BACKGROUND

In a multicore system, there are several shared resources. One of the most common shared resources is SRAM and typically the design expectation is that it is accessible with zero -wait latency. In such a system, simple fixed priority or round robin scheme may be used to arbitrate accesses from the CPU or masters. However, sharing memory adds overhead in meeting higher clock speeds. One such critical path is generation of a stall signal (READY) to CPU or master. When multiple masters are accessing the same resource, the stall signal of a given CPU depends on accesses from the other masters. This creates long timing paths from one master to other and these paths limit maximum clock speed of the system that can be achieved.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides a multi master system on chip (SoC) that includes a plurality of masters comprising a first master and a second master, each configured to generate a request. A next state generator in the multi master SoC is configured to generate a next state of a round robin pointer in response to the request and a current state of the round robin pointer. The round robin pointer is configured to generate an enable signal to enable a priority encoder for the first master in response to the current state of the round robin pointer. Further, the next state of the round robin pointer is generated such that a priority is maintained for the first master until there is a request from the second master.

Another embodiment provides a method for arbitrating in a multi-master SoC. A request from a plurality of masters comprising a first master and a second master is generated. Then, a next state of a round robin pointer is generated in response to the request and a current state of the round robin pointer. An enable signal is generated to enable a priority encoder for the first master in response to the next state of the round robin pointer, such that priority for the first master is maintained until there is a request from the second master.

Another embodiment provides a multi master system on chip (SoC) that includes a plurality of masters comprising a first master and a second master, each configured to generate a request. A next state generator includes a multiplexer in the multi master SoC configured to generate a next state of a round robin pointer in response to the request and a current state of the round robin pointer. A plurality of priority encoders, each associated with the plurality of masters is configured to generate a grant signal to the associated master that completes the request. The round robin pointer is configured to generate an enable signal to enable a priority encoder for the first master in response to the current state of the round robin pointer. Further, the next state of the round robin pointer is generated such that a priority is maintained for the first master until there is a request from the second master.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
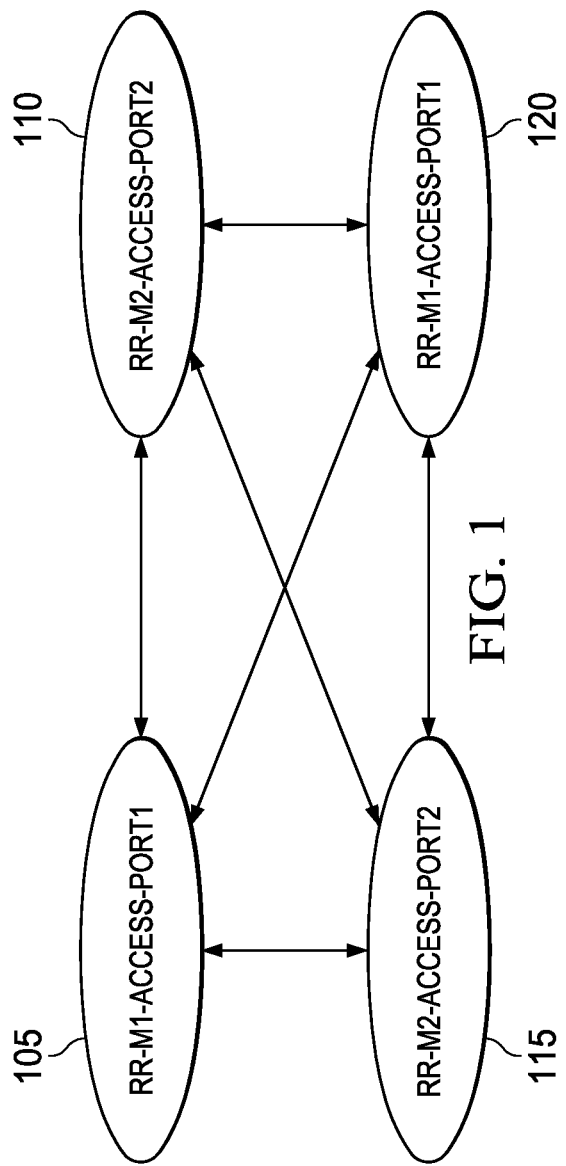
FIG. 1 illustrate a round robin state machine in a multi master environment.

FIG. 1 illustrates a round robin arbitration scheme in a multi master environment.

The round robin scheme is illustrated assuming the multi master environment has 2 masters (M1 and M2) and each master has two request ports. Master M1 has M1_ACCESS_Port-1 and M1_ACCESS_Port-2 and master M2 has M2_ACCESS_Port-1 and M2_ACCESS_Port-2. In total there are four requests and these requests are to be serviced in a round robin fashion. The corresponding round robin states of the two requests ports of each master are illustrated in FIG. 1, namely RR-M1 -ACCESS-Port1 (105), RR-M2-ACCESS-Port2 (110), RR-M1-ACCESS-Port1 (115), and RR-M2-ACCESS-Port2 (120). In case of simultaneous accesses then accesses are serviced in following order, RR-M1_ACCESS_Port-1 followed by RR-M1_ACCESS_Port-2 followed by M2_ACCESS_Port-1 and then followed by RR-M2_ACCESS_Port-2. A round robin state is changed only upon granting a request on the access port of a given master. For example assuming that the round robin pointer in RR-M1-ACCESS-Port1 (105) is granted (meaning M1_ACCESS_Port-1 request is granted), then a state machine will be moved to RR-M2-ACCESS-Port2 (110). If there is a request from M2_ACCESS_Port1, and if it is granted, then the round robin state machine will move to M2_ACCESS_Port-2.

In round robin implementation there is a round robin pointer that decides which master gets highest priority when it is a particular state, i.e each master will have different priority in these states. Table below shows the order priory of accesses in each state.

| RR POINTER = RR-M1-ACCESS-Port1 | RR POINTER = RR-M1-ACCESS-Port2 | RR POINTER = RR-M2-ACCESS-Port1 | RR POINTER = RR-M2-ACCESS-Port2 |
|---|---|---|---|
| Order of priority M1_ACCESS_PORT1 M1_ACCESS_PORT2 M2_ACCESS_PORT1 M2_ACCESS_PORT2 | Order of priority M1_ACCESS_PORT2 M2_ACCESS_PORT1 M2_ACCESS_PORT2 M1_ACCESS_PORT1 | Order of priority M2_ACCESS_PORT1 M2_ACCESS_PORT2 M1_ACCESS_PORT1 M1_ACCESS_PORT2 | Order of priority M2_ACCESS_PORT2 M1_ACCESS_PORT1 M1_ACCESS_PORT2 M2_ACCESS_PORT1 |

Figure 2:
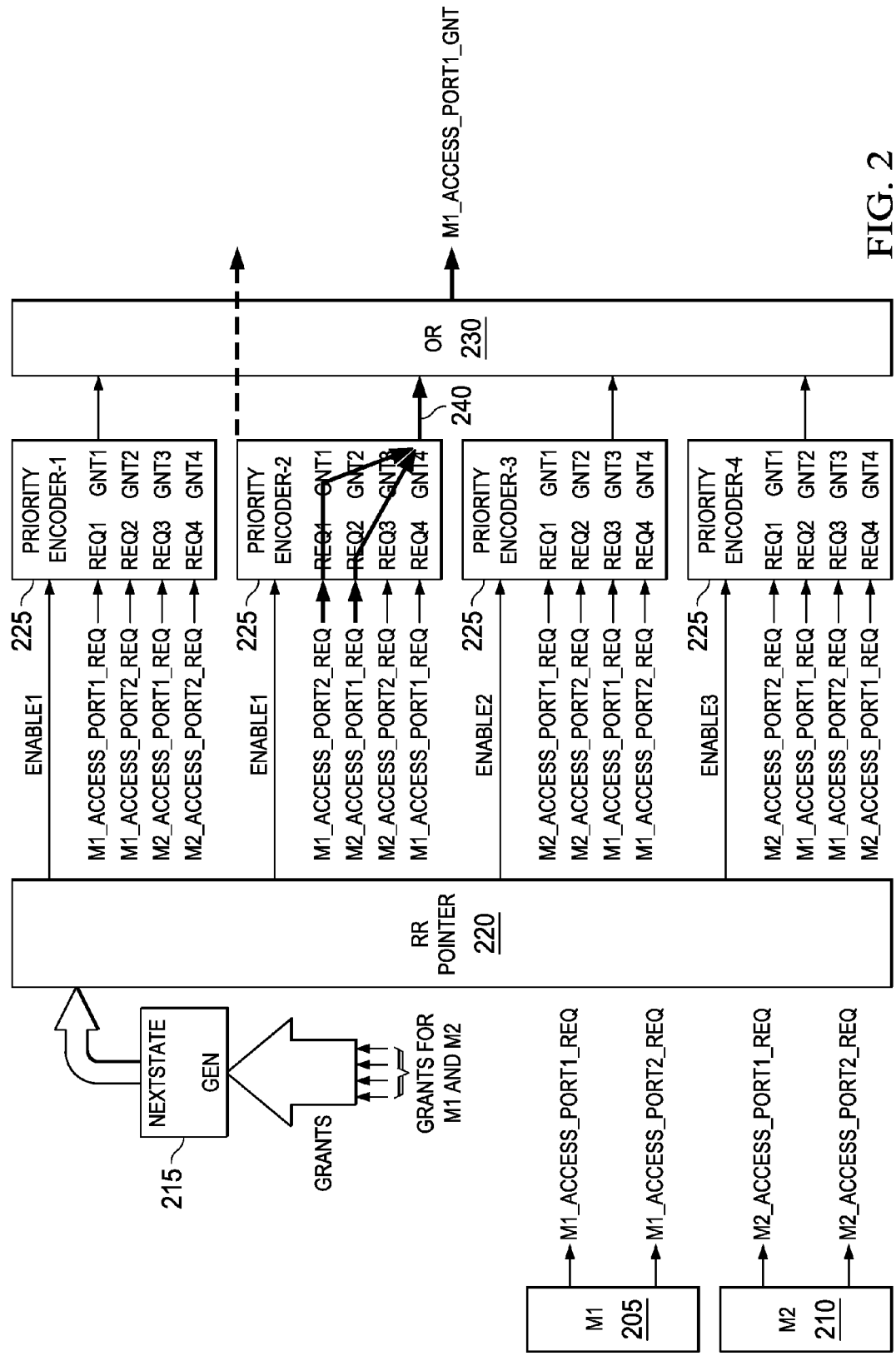
FIG. 2 illustrates a round robin arbitration scheme in a multi master environment.

FIG. 2 illustrates a round robin arbitration scheme in a multi master environment. The multi master environment has 2 masters M1 205 and M2, 210. Each master (205, 210) has two access ports. For example master M1 205 has two ports that generate two requests M1_ACCESS_Port1_REQ and M1_ACCESS_Port2_REQ. Similarly, master M2 210 has M2_ACCESS_Port1_REQ and M2_ACCESS_Port2_REQ. The requests are given to a set of priority encoders 225. The next state generator 215 has a bus input named as GRANTS 208 which consists of grant signals for each request for M1, 205 and M2, 210 (for example, M1_ACCESS_PORT1_GRANT). The next state generator 215 receives the grants and identifies the next state of a round robin pointer 220. Round robin pointer 220 receives the next state (output of the next state generator 215) and moves to next high priority accesses with respect to currently granted access. For example if current GRANT is M1_ACCESS_PORT1, then the round robin pointer 220 will move to M1_ACCESS_PORT2. The round robin pointer 220 is configured to generate ENABLES (ENABLE 1-4) corresponding to a current state. At any given time only one ENABLE is active that selects a corresponding priority encoder 225.

The priority encoder 225 receives inputs ENABLE, REQ1, REQ 2, REQ 3 and REQ 4 and generates GRANTS (GNT1, GNT 2, GNT 3 and GNT 4) as outputs. It is noted that the GNT2, GNT3 and GNT4 are not only function of its respective request but also depend on other requests. An OR gate 230 receives the grants from the priority encoders 225 and generates a final grant by performing a logical OR operation. The final grant indicates current request is stalled or granted by the round robin arbitration logic. As illustrated in FIG. 2, the access grant for M1_ACCESS_PORT1 is given as M1_ACCESS_PORT1_GNT that is fed back to M1. M1_ACCESS_PORT1_GNT is function of all four access requests from two access ports of M1 and M2.

If there is a low priority request in the priority encoder 225, the grant can be given only after considering all the high priority requests. It is also noted that the low priority grants is a function of requests generated form all the access ports of the masters. This creates a combinational path form one master to the other through grant. The path 240 (from M2_ACCESS_PORT1_REQ to GNT4 of priority encoder 2 (225) to M1_ACCESS_PORT1_GNT and then to M1 as highlighted in FIG. 2, causes long combinational paths from one master to other through GNT. The combination path limits maximum clock speed achieved on these timing paths.

Figure 3:
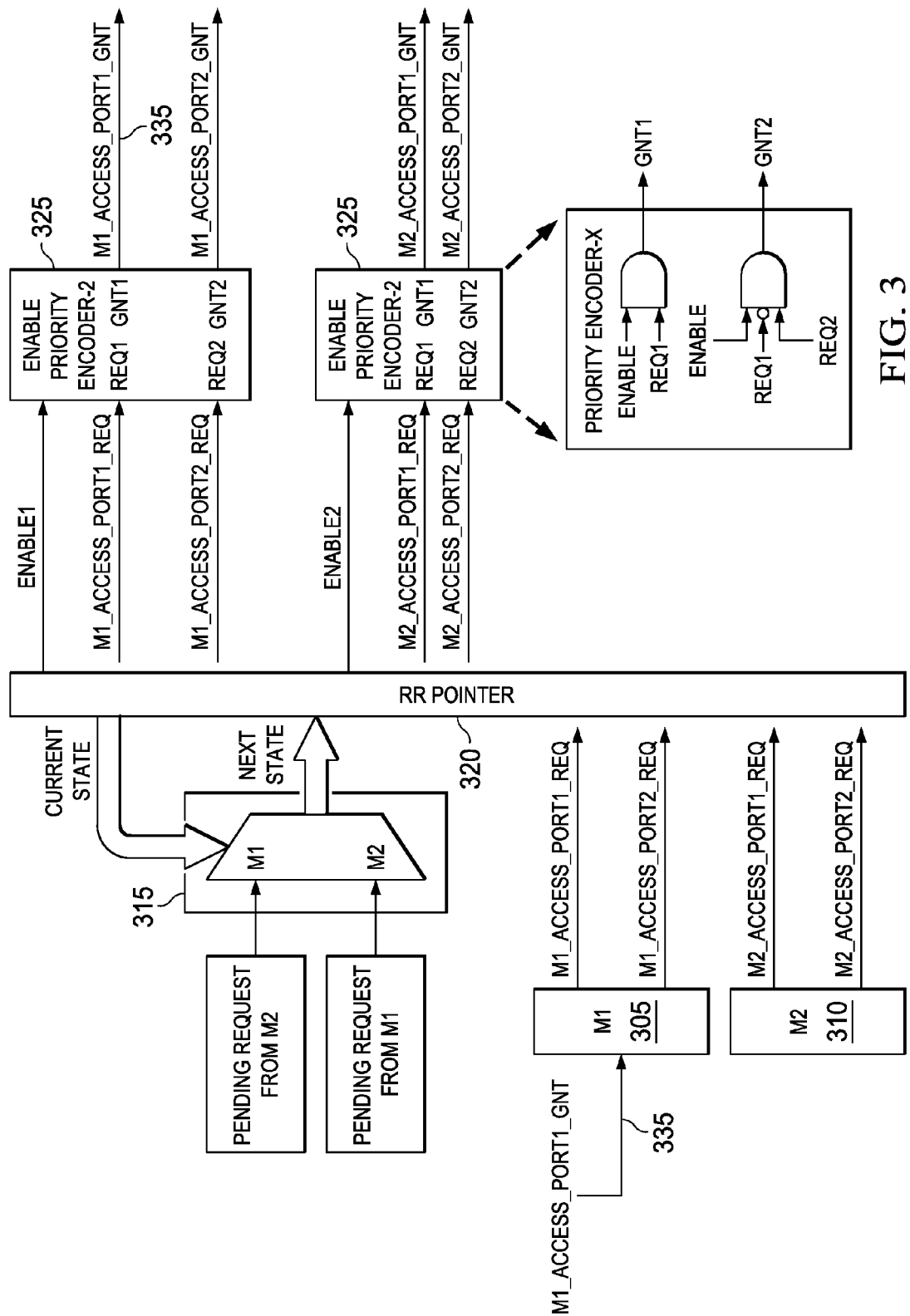
FIG. 3 illustrates a multi master arbitration scheme according to an embodiment.

To avoid a long combinational path as explained above, a multi master arbitration scheme is illustrate in FIG. 3 that combines a fixed priority and a round robin scheme, according to an embodiment. The multi master arbitration scheme includes a plurality of masters having a first master M1 (305) and a second master M2 (310). Each master has two access ports configured to generate a request. For example, master M1 (305) has two ports that generate two requests M1_ACCESS_Port1_REQ and M1_ACCESS_Port2_REQ. Similarly, master M2 (310) has M2_ACCESS_Port1_REQ and M2_ACCESS_Port2_REQ. A request includes a read request and a write request.

The next state generator 315 receives a current state of the round robin pointer 320 and pending requests from M1 (305) and M2 (310), and in response, is configured to generate a next state of a round robin pointer 320. The next state generator 315 has a multiplexer configured to check pending requests of a given master on a current round robin pointer state and generates the next state of the round robin pointer 320 in response to the current state of the round robin pointer 320. In an embodiment, pending request from the M2 (310) is checked for only when the round robin pointer 320 belongs to M1 (305) and vice versa.

The round robin pointer 320 receives the next state from the next state generator 315 and moves to the next state as given by the next state generator 315. In an embodiment, the round robin pointer 320 is configured to be in a same state until there is a request from the other master. For example, if the round robin pointer is with M1 (305), the round robin pointer is configured to be with M1 (305) until there is a request from M2 (310). In other words, the next state of the round robin pointer 320 is generated such that a priority is maintained for the first master M1 (305) until there is a request from the second master M2 (310).

The round robin pointer 320 is configured to generate ENABLES corresponding to its current state. At any given time, only one ENABLE is active that selects a corresponding priority encoder 325. In this embodiment, there are two priority encoders 325 corresponding to each master M1 (305) and M2 (310). These priority encoders 325 are configured to arbitrate request only from a corresponding master. Note that in the example of FIG. 3, there are only two masters. In other embodiments, there are several masters in the multi master scheme and each master will have a corresponding priority encoder 320 configured to arbitrate request from each corresponding master. It is also noted that the number of states of the round robin pointer 320 are equal to the number of masters in the multi master scheme and not equal to the total number of requests generated form each master. This means that the states of the round robin pointer 320 are configured to be independent of the number of requests from each master.

The priority encoder 325 receives inputs ENABLE, REQ1 and REQ 2 and generates grants GNT1 and GNT 2 as outputs. Each priority encoder 320 has logic gates that generate either GNT 1 or GNT 2. In this example, when an ENABLE is active and if there is REQ1, then GNT 1 is generated. If the ENABLE is active and if there is REQ2 and there is no REQ1, then GNT 2 is generated as illustrated in FIG. 3. Note that GNT 1 and GNT2 are only function of its respective request from a corresponding master. It is noted that a GNT is generated independent from a request from another master. For example, M1_ACCESS_PORT1_GNT1 generation does not depend on request form M2. The grant signal M1_ACCESS_PORT1_GNT1 is given as an input to M1 in response to the request indicating M1_ACCESS_PORT1_REQ is stalled or granted by the round robin pointer 320. As illustrated in the figure, the access grant for M1_ACCESS_PORT1 is given as M1_ACCESS_PORT1_GNT (335) to M1 (305) that completes the request. In an embodiment, each priority encoder 325 is configured to generate the GRANT using a fixed priority arbitration scheme in response to the ENABLE and the requests from each port of a same master. The requests from different masters are configured to be arbitrated using round robin arbitration scheme.

Figure 4:
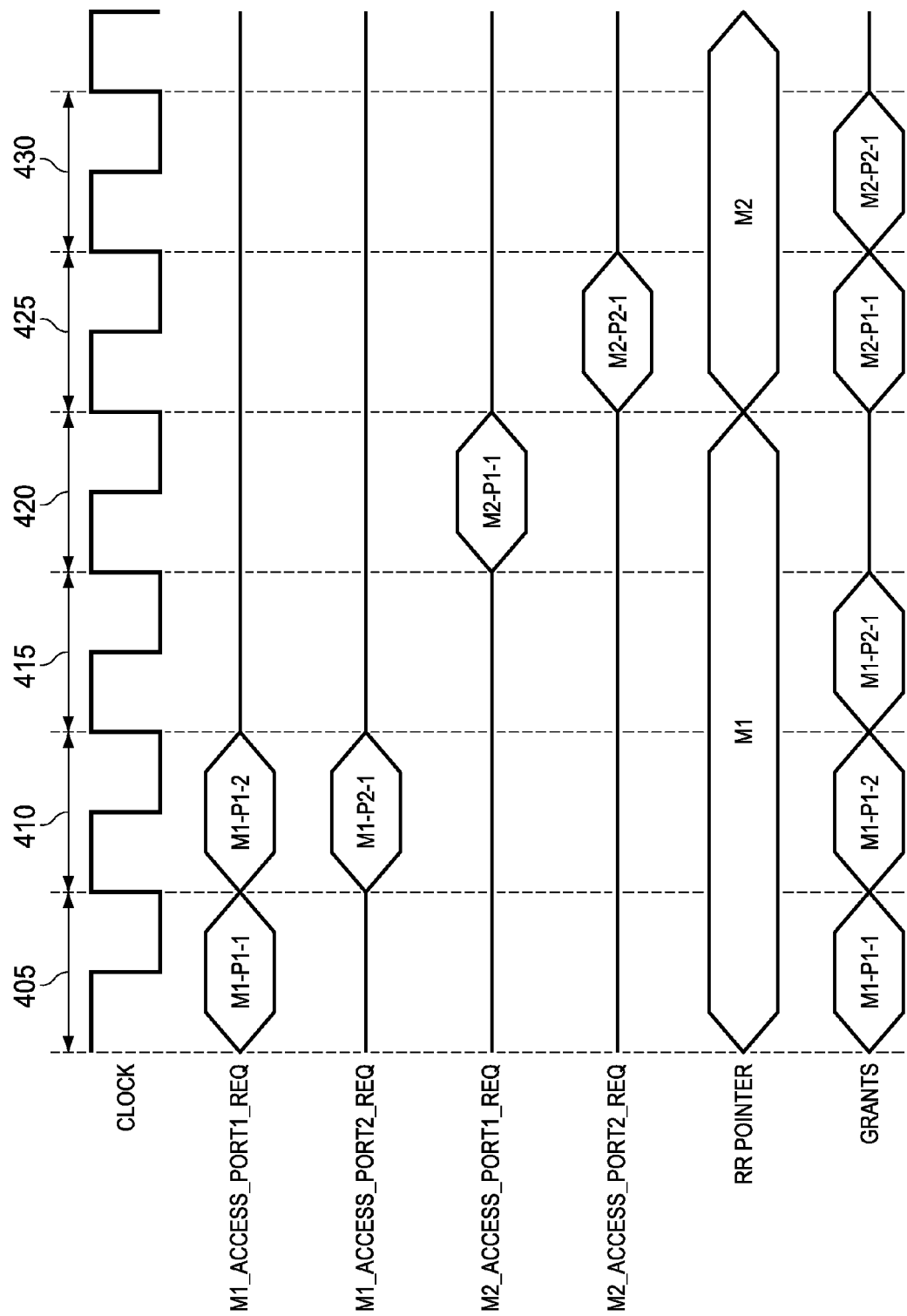
FIG. 4 is a timing diagram illustrating the operation of the multi master arbitration scheme of FIG. 3.

FIG. 4 is a timing diagram illustrating the operation of the multi master arbitration scheme of FIG. 3. The timing diagram has clock cycles 405, 410, 415, 420, 425 and 430. In an example, there are three requests from first master M1 (305) namely M1-P1-1, M1-P1-2 and M1-P2-1 and two requests form second master M2 (310) namely M2-P1-1 and M2-P2-1. In cycle 405, round robin pointer 320 is with M1 and access M1-P1-1 on access port M1_ACCESS_PORT1_REQ is granted immediately. In cycle 410, the round robin pointer 320 is with M1 and it is configured to be with M1 because there are no pending requests from M2. M1-P1-2 is granted immediately due to fixed priority arbitration between the same master request M1-P1-2 and M2-P2-1. In cycle 415, the round robin pointer 320 is with M1, and it is configured to be with M1 because there are no pending requests from M2 and M1-P2-1 is granted immediately. It can be noted that all three requests are completed in three cycles and there is no wastage of cycles between the grants.

In cycle 420, the round robin pointer 320 is with M1 and it is configured to be with M1 because there are no pending requests from M2 in cycle 415. M2-P2-1 will not be granted since the round robin state is with M1, and in state M1 accesses from M2 are not checked for. Note that there is a delay on M2-P2-1 access and this latency is applicable for first accesses only. For the first three grants in cycles 405-415, back to back accesses are granted without any latency for M1.

In cycle 425, the round robin pointer 320 is with M2, and access M2-P1-1 on access port is granted immediately. And M2-P2-1 is granted in the following cycle 430.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A multi-master system on chip, comprising:
    a plurality of masters comprising a first master and a second master, each of the plurality of masters configured to generate a request; and
    a next state generator configured to generate a next state of a round robin pointer in response to the request and a current state of the round robin pointer;
        wherein the round robin pointer is configured to generate an enable signal to enable a priority encoder for the first master in response to the current state of the round robin pointer, and wherein the next state of the round robin pointer is generated such that a priority is maintained for the first master until there is a request from the second master.

2. The multi-master system on chip of claim 1, wherein the next state generator comprises:
    a multiplexer configured to generate the next state of the round robin pointer in response to the current state of the round robin pointer and only pending requests from the second master.

3. The multi-master system on chip of claim 1, wherein each master comprises a plurality of ports that are configured to generate the request that includes a read request and a write request.

4. The multi-master system on chip of claim 1, wherein the next state and the current state of the round robin pointer are configured to be independent of the number of requests from each master.

5. The multi-master system on chip of claim 1, wherein the next state and the current state of the round robin pointer are configured to be determined by the plurality of masters in the multi-master system on chip.

6. The multi-master system on chip of claim 1 and further comprising:
    a plurality of priority encoders, each associated with the one of the plurality of masters, configured to generate a grant signal to the associated master that completes the request.

7. The multi-master system on chip of claim 6, wherein the each of the plurality of priority encoders is configured to generate the grant signal using a fixed priority arbitration scheme in response to the enable signal and the requests from each port of a same master.

8. The multi-master system on chip of claim 6, wherein one of the plurality of encoders is configured to be enabled in a given state of the round robin pointer.

9. The multi-master system on chip of claim 1, wherein the round robin pointer is configured to be in a same state until there is a request from the second master.

10. The multi-master system on chip of claim 1, wherein requests from different masters of the plurality of masters are configured to be arbitrated using round robin arbitration scheme and requests from a same master are configured to be arbitrated with fixed priority arbitration scheme.

11. A method for arbitrating in a multi-master system on chip, the method comprising:
    generating a request from a plurality of masters comprising a first master and a second master;
    generating a next state of a round robin pointer in response to the request and a current state of the round robin pointer; and
    generating an enable signal to enable a priority encoder for the first master in response to the next state of the round robin pointer, such that priority for the first master is maintained until there is a request from the second master.

12. The method of claim 11, wherein the next state and the current state of the round robin pointer are configured to be independent of the number of requests from each master.

13. The method of claim 11, wherein the next state and the current state of the round robin pointer are determined by the plurality of masters in the multi-master system on chip.

14. A multi-master system on chip, comprising:
    a plurality of masters comprising a first master and a second master, each of the plurality of masters configured to generate a request;
    a next state generator having a multiplexer configured to generate a next state of a round robin pointer in response to the request and a current state of the round robin pointer; and a plurality of priority encoders, each associated with the plurality of masters configured to generate a grant signal to the associated master that completes the request; wherein:
the round robin pointer is configured to generate an enable signal to enable a priority encoder for the first master in response to the current state of the round robin pointer; and
the next state of the round robin pointer is generated such that a priority is maintained for the first master until there is a request from the second master.

15. The multi-master system on chip of claim 14, wherein the next state and the current state of the round robin pointer are configured to be independent of the number of requests from each master.

16. The multi-master system on chip of claim 14, wherein the next state and the current state of the round robin pointer are determined by the plurality of masters in the multi-master system on chip.

17. The multi-master system on chip of claim 14, wherein the each of the plurality of priority encoders is configured to generate the grant signal using a fixed priority arbitration scheme in response to the enable signal and the requests from each port of a same master.

18. The multi-master system on chip of claim 14, wherein one of the plurality of encoders is configured to be enabled in a given state of the round robin pointer.

19. The multi-master system on chip of claim 14, wherein the round robin pointer is configured to be in a same state until there is a request from the second master.

* * * * *